US011888798B2

(12) United States Patent
Shetty et al.

(10) Patent No.: US 11,888,798 B2
(45) Date of Patent: Jan. 30, 2024

(54) ATTACHMENT AND EMBEDDED OBJECT POSITIONING VALIDATION

(71) Applicant: VMWARE, INC., Palo Alto, CA (US)

(72) Inventors: Rohit Pradeep Shetty, Bangalore (IN); Ramanandan Nambannor Kunnath, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 6 days.

(21) Appl. No.: 17/458,633

(22) Filed: Aug. 27, 2021

(65) Prior Publication Data
US 2023/0019474 A1    Jan. 19, 2023

(30) Foreign Application Priority Data
Jul. 13, 2021    (IN) .............................. 202141031509

(51) Int. Cl.
*H04L 51/08* (2022.01)
*H04L 67/306* (2022.01)
*H04L 51/212* (2022.01)
*H04L 51/224* (2022.01)

(52) U.S. Cl.
CPC ............ *H04L 51/08* (2013.01); *H04L 51/212* (2022.05); *H04L 51/224* (2022.05); *H04L 67/306* (2013.01)

(58) Field of Classification Search
CPC ..... H04L 51/08; H04L 51/212; H04L 51/224; H04L 67/306
See application file for complete search history.

(56) References Cited

U.S. PATENT DOCUMENTS

| 6,453,338 | B1* | 9/2002 | Shiono ................. G06Q 10/107 714/39 |
| 8,286,085 | B1* | 10/2012 | Denise ................. G06Q 10/107 715/752 |
| 2013/0227043 | A1* | 8/2013 | Murakami .............. H04L 51/08 709/206 |
| 2014/0344662 | A1* | 11/2014 | Isabel ................... G06F 40/171 715/230 |
| 2016/0080301 | A1* | 3/2016 | Ueno ...................... G06F 21/56 709/206 |
| 2020/0396190 | A1* | 12/2020 | Pickman ............. H04L 63/1483 |

* cited by examiner

*Primary Examiner* — Austin J Moreau
(74) *Attorney, Agent, or Firm* — King Intellectual Asset Management

(57) ABSTRACT

Disclosed are various approaches for validating a relevance or an accuracy associated with an item being attached to a message or inserted inline with the text of the message or other type of document. An addition of the item (e.g., attachment, hyperlink, embedded image, etc.) to the message being generated by a sender can be detected. Message keywords associated with the message content and item keywords associated with the item content can be identified following an analysis of the message content and item content. The message keywords and item keywords can be compared to determine a likelihood of a mismatch between the item and the message. Upon determining a potential mismatch and prior to the message being sent to a recipient, a notification identifying the likelihood of the mismatch is presented to the sender.

20 Claims, 8 Drawing Sheets

ATTACHMENT AND EMBEDDED OBJECT POSITIONING VALIDATION

RELATED APPLICATIONS

Benefit is claimed under 35 U.S.C. 119(a)-(d) to Foreign Application Serial No. 202141031509 filed in India entitled "ATTACHMENT AND EMBEDDED OBJECT POSITIONING VALIDATION", on Jul. 13, 2021, by VMware, Inc., which is herein incorporated in its entirety by reference for all purposes.

BACKGROUND

With the emergence of bring-your-own-device (BYOD) technology in the workplace, enterprises permit employees or other personnel to use their own devices for business purposes. This can include accessing enterprise data, such as email and corporate documents. However, prior to an employee using his or her own device in the workplace, a company can require the employee to enroll with a management service capable of protecting enterprise data from theft, loss, and unauthorized access. Administrators can utilize the management service to oversee the operation of the devices enrolled with or otherwise managed by the service. Managed devices can also include one or more programs that can access, manage, edit, or perform functions with respect to enterprise data. For example, a user can access email through the one or more programs of a managed device.

Attachments (e.g., images, files, video, etc.), embedded object (e.g., images, links, videos, text), and hyperlinks are widely used in emails, chats, and other forms of messaging to provide further clarity to the content and also to enhance the recipient experience. However, situations can occur where a sender inadvertently attaches the incorrect attachment to a message or inserts an image in line with the body content of an email message at an unsuitable location. This usually leads to confusion and, in various cases, requires the exchange of additional messages for clarification. Further, in some occasions, data leaks can occur or sensitive subject matter can be compromised when the wrong data or sensitive subject matter that is access-restricted to the recipient is accidentally sent to the recipient. For example, a data leak or exposure to sensitive material can occur when data associated with User A is accidentally sent to User B or when an email message discussing the upgrades to Enterprise Product A includes an attachment that corresponds to a non-released Enterprise Product B.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2A illustrates an example scenario of an incorrect attachment being attached to an email message.

FIG. 2B illustrates an example scenario of an image being placed in an incorrect position within the body of the email message. FIG. 2C illustrates an example of an incorrect link being included in the content of an email message.

DETAILED DESCRIPTION

The present disclosure relates to validating a relevance or an accuracy associated with an item being attached to a message or inserted inline with the text of the message or other type of document. The message can include an email message, a chat message, a text document, a HyperText Markup Language document, or other type of text-based message or document. An item can include an attachment (e.g., text document, video, image, etc.), an embedded object (e.g., images, video, etc.), a hyperlink, or other type of item that can be attached to or inserted inline with text of a message or document to provide further clarity to the content and enhance the recipient or reader experience. In various examples, the content of the message and the item are both individually analyzed to determine a likelihood that the item is wrongly attached to or inserted within the message content. For example, keywords can be extracted from both the content and the item and semantically compared to determine whether there is a mismatch with respect to content and/or context. When a mismatch or potential inaccuracy is detected, a notification can be generated and presented to a user (e.g., message sender, document creator, etc.) notifying the user of the issue prior to the user sending the message to a recipient. Providing the sender the opportunity to rectify any issues associated with a mismatch between the item and the content helps reduces any potential confusion, data leaks, or security issues that may occur with a recipient viewing a wrongly attached or inserted item.

Figure 1:
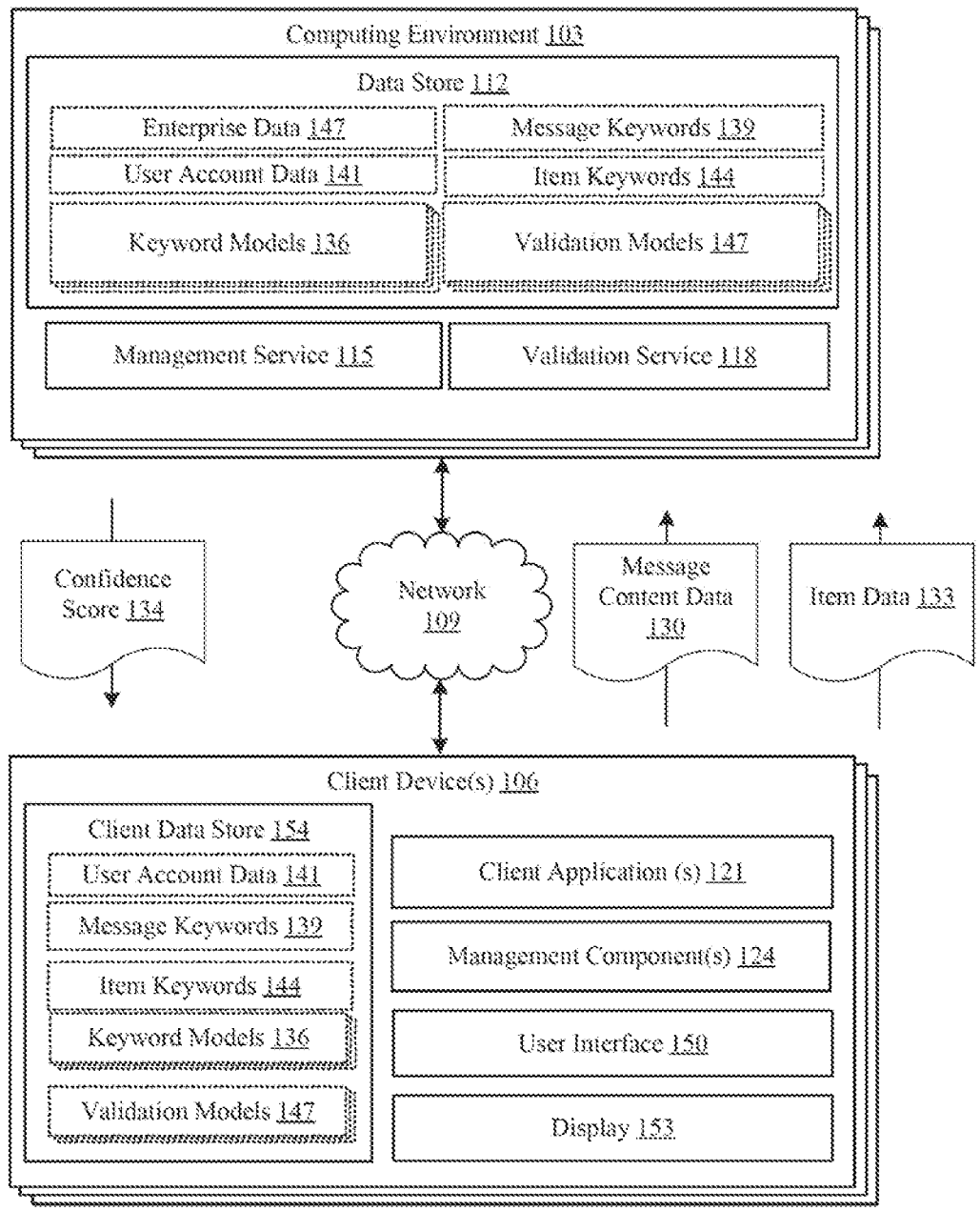
FIG. 1 is a schematic block diagram depicting an example of a network environment.

Beginning with FIG. 1, shown is an example of a network environment 100. The network environment 100 includes a computing environment 103 and a client device 106 which are in data communication with each other across a network 109. The network 109 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environment 103 can include a grid computing resource or any other distributed computing arrangement. The computing devices can be located in a single installation or can be distributed among many different geographical locations. The computing environment 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client devices 106 remotely over the network 109, the computing environment 103 can be described as a "remote" or "cloud" computing environment 103.

The computing environment 103 can include a data store 112. The data store 112 can include memory of the computing environment 103, mass storage resources of the computing environment 103, or any other storage resources on which data can be stored by the computing environment 103. The data stored in the data store 112, for example, can be associated with the operation of the various applications or functional entities described below.

The components executed on the computing environment 103 can include, for example, a management service 115, a validation service 118 as well as other applications, services, processes, systems, engines, or functionality not discussed in detail herein. The management service 115 can oversee the operation of multiple client devices 106. In some examples, an enterprise, such as one or more companies or other organizations, can operate the management service 115 to oversee or manage the operation of the client devices 106 of its employees, contractors, customers, or other users having user accounts with the enterprise.

The management service 115 can cause various software components to be installed on a client device 106. Such software components can include, for example, client applications 121, resources, libraries, drivers, device configurations and profiles, or other similar components that require installation on the client device 106 as specified by an administrator of the management service 115. The management service 115 can further cause policies to be implemented on a client device 106. Policies can include, for example, restrictions or permissions pertaining to capabilities of a client device 106 such that access to enterprise data 127 is secured on the client device 106.

The management service 115 can interact with one or more client applications 121 executed on the client device 106 to perform management functions. In one example, the management service 115 can interact with a management component 124 on a client device 106 associated with an end user to enroll the client device 106 with the management service 115. The management component 124 can be installed when the client device 106 is enrolled as a managed device with the management service 115. When enrolled, the management component 124 can be registered as a device administrator of the client device 106, which can provide the management component 124 with sufficient privileges to control the operation of the client device 106. In one example, the management component 124 can be registered as the device administrator through the installation of a management profile at the operating system of the client device 106 that causes the operating system to designate the management component 124 as the device administrator.

The management service 115 can direct the management component 124 to perform device management functions on the client device 106. For example, the management service 115 can direct the management component 124 to control access to certain software or hardware functions available on the client device 106. As a result, the management service 115 can verify that the configuration and operation of the client device 106 is in conformance with predefined criteria that ensures that enterprise data 127, or other data, is protected from data loss, unauthorized access, or other harmful events.

The management service 115 can further provision enterprise data 127 to the client device 106 through the management component 124 or the client application 121. In one example, the management service 115 can cause the management component 124 or the client application 121 to control use of the client device 106 or provision enterprise data 127 to the client device 106 through use of a command queue provided by the management service 115. In some examples, the management service 115 can store commands in a command queue associated with a particular client device 106 and accessible by the particular client device 106.

In some examples, the management service 115 can transmit an instruction to an original equipment manufacturer (OEM) messaging service specific to the client devices 106 to cause the OEM specific messaging service to send an instruction to the operating systems of the client device 106, which causes the client device 106 to retrieve commands from the command queues provided by the management service 115. In other examples, the management component 124 is executed by such client device 106 to retrieve the contents of the command queue. In one example, the management component 124 or the client application 121 can retrieve the contents of the command queue on a configured interval, such as every four hours, or upon detection of a certain event, such as detection of an unauthorized application being executed by the client device 106. The management service 115 can also push commands to the management component 124 or the client application 121. In any case, the management component 124 or the client application 121 can receive the contents of the command queue from the management service 115.

The validation service 118 can analyze message content data 130 and item content data 133 provided from the client application 121 of the client device 106 to determine a confidence score 134 that reflects a likelihood that the item is wrongly attached to or wrongly inserted within the message content associated with the message content data 130. In various examples, the message content data 130 corresponds to the content (e.g., subject, body text, etc.) of a message or document being created by a user (e.g., message sender, document creator) via the client application 121. Similarly, the item content data 133 corresponds to the content associated with the item (e.g., item title, item file name, image, text document, presentation document, video, hyperlink, etc.) being attached to or inserted within the message or document.

In various examples, the validation service 118 can receive the message content data 130 and item content data 133 from the client application 121 following the detection of the item being added by the client application 121. The validation service 118 can analyze the message content data 130 to identify message keywords 139 that include terms extracted from the message and other message details (e.g., entity names for sections or paragraphs in the message body) from the message content data 130 with respect to the given message context. In various examples, the validation service 118 analyzes the message content data 130 by applying the message content data 130 to one or more keyword models 136 that are trained to extract the message keywords 139 for the given context. The keyword models 136 applied to the message content data 130 are created and trained according to machine learning techniques such as, for example, keyword extraction, named-entity recognition (NER), text categorization, image recognition classification, object character recognition (OCR), etc.

In various examples, the validation service 118 selects a keyword model 136 from a plurality of keyword models 136 according to sender user account data 141 or other data associated with the message. The sender user account data 141 can include various information about the sender including, for example, a role of the sender in an organization, access permissions associated with the sender, an organization or business unit associated with the sender, or other data that can further define the context of a given message. For example, one keyword model 136 can be trained using keywords or content corresponding to a first business unit (e.g., sales team) in the organization and another keyword model 136 may be trained using keywords or content corresponding to a second business unit (e.g., product development team) in the organization. Upon identifying the message keywords 139, the validation service 118 can store the message keywords 139 in the data store 112. In some examples, the validation service 118, via the analysis of the message content data 130, can identify various sections or paragraphs of text within the message content data 130 and store the message keywords 139 in the data store 112 or other temporary cache with respect to the corresponding section or paragraph from which the keywords were extracted.

The validation service 118 can also analyze the item content data 133 to identify item keywords 144 that include keywords or terms extracted from and/or associated with the item content data 133. In various examples, the validation service 118 analyzes the item content data 133 by applying the item content data 133 to one or more keyword models 136 that are trained to extract the item keywords 144 for the given type of item (e.g., text document, image, video, hyperlink, screenshot, etc.). The keyword models 136 applied to the item content data 133 are created and trained according to machine learning techniques such as, for example, keyword extraction, named-entity recognition (NER), text categorization, image recognition classification, object character recognition (OCR), etc.

In various examples, the validation service 118 selects a keyword model 136 from a plurality of keyword models 136 according to the type of item to be analyzed. For example, in the example of an attachment, the attachment can comprise an image, a text document, a video, or other type of attachment. In an example where the attachment comprises a text document, the validation service 118 may select a keyword model 136 that is trained according to keyword extraction techniques. In an example where the attachment comprises an image, the validation service 118 may select a keyword model 136 that is trained according to object character recognition techniques. As such, the validation service 118 can identify the type of item according to properties associated with the item (e.g., file type, file size, file name, file format etc.) and select the appropriate keyword model 136 according to the type of item. Upon identifying the item keywords 144, the validation service 118 can store the item keywords 144 in the data store 112 or other temporary cache.

The validation service 118 can semantically compare the message keywords 139 and the item keywords 144 to determine a confidence score 134 that reflects a likelihood that the item is wrongly attached to or wrongly inserted within the message content associated with the message content data 130. In various examples, the validation service 118 can apply the message keywords 139 and the item keywords as labels to a validation model 147. The validation model 147 can comprise one or more machine learning models that are trained to output the confidence score 134 indicating a likelihood that the item is wrongly attached to or inserted within the message. In various examples, the validation service 118 can further apply inputs that define the context (e.g., organization, user permissions, user role, item type, etc.) to the validation model 147. The validation model 147 is trained to semantically compare the message keywords 139 with the item keywords 144 to determine the likelihood of a mismatch between the message and the item. While the validation model 147 can be distinct from the keyword models 136, in some examples, the validation model 147 can be incorporated within the one or more keyword models 136. In other examples, the one or more keyword models 136 may be incorporated within the validation model 147.

Upon determining the confidence score 134, the validation service 118 can cause the confidence score 134 to be transmitted to the client device 106. In some examples, the validation service 118 can transmit the confidence score 134 to the client application 121. In other examples, the validation service 118 can interact with the management service 115 which in turn provides the confidence score 134 to the client device 106. For example, the management service 115 can push the confidence score 134 to the management component 124 or the client application 121. In another example, the management service 115 can store the confidence score 134 in a command queue and the management component 124 or the client application 121 can retrieve the contents of the command queue (e.g., the confidence score 134) on a configured interval or upon detection of a certain event.

The data stored in the data store 112 can include, for example, enterprise data 127, user account data 141, keyword models 136, message keywords 139, item keywords 144, validation models 147, as well as other data. Enterprise data 127 includes data associated with the enterprise. The enterprise data 127 can include files that can include images, videos, email, corporate documents, social media, messages, enterprise applications, confidential documents, a spreadsheet, a word processing document, or other enterprise content or communications. For example, an end user that is enrolled and authenticated with the management service 115 can access the enterprise data 127 using the client application 121 or management component 124. However, if an end user is no longer enrolled in the management service 115 or an authentication of the end user fails, the management service 115 can restrict access by the client application 121 or the management component 124 to the enterprise data 127.

The user account data 141 can include information pertaining to end user of the client devices 106 enrolled with the management service 115. For instance, the user account data 141 can include data used to authenticate an end user, such as a user name, password, email address, biometric data, device identifier, registry identifier, or other data. Additionally, the user account data 141 can include other information associated with an end user, such as name, a role of the user within an organization, permissions for accessing enterprise data 127, an organization unit, or other information.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can execute client applications 121, the management component 124, and other components. Some client applications 121 and the management component 124 can access network content served up by the computing environment 103 or other servers, thereby rendering a user interface 150 on a display 153, such as a liquid crystal display (LCD), touch-screen display, or other type of display device. To this end, some client applications 121 can include a browser or a dedicated application, and a user interface 150 can include a network page, an application screen, or other interface. Further, the client applications 121 can include device email applications, management applications, enterprise applications, social networking applications, word processors, spreadsheet applications, media viewing applications, or other applications.

In various examples, the client application 121 includes an application that can be used by a user to create a message. The client application 121 can detect the addition of an item to a message being generated by the user. The message can include an email message, a chat message, a text document, a HTML, document, or other type of text-based message or document. The item can include an attachment (e.g., text document, video, image, etc.), an embedded object (e.g., images, video, etc.), a hyperlink, or other type of item that can be attached to or inserted inline with text of a message or document to provide further clarity to the content and enhance the recipient or reader experience. Upon detecting the addition of the item, the client application 121 can determine if the client device 106 is offline or online. For example, the client device 106 can be considered online if the client device 106 is connected to the enterprise network associated with the enterprise managing the client device. Similarly, the client device 106 can be offline if the client device 106 is not connected to the enterprise network associated with the enterprise managing the client device 106.

If the client application 121 determines that the client device 106 is online, the client application 121 can transmit the message content data 130 associated with the message being generated and the item content data 133 associated with the added item to the validation service 118 in the computing environment 103 such that the confidence score 134 is generated in the computing environment 103 and returned to the client application 121.

If the client application 121 determines that the client device 106 is offline, the client application 121 can generate the confidence score 134 locally if the user account data 141 indicates that the managed device associated with the user is permitted to generate the confidence score 134 in an offline setting. In the offline setting, the client application 121 incorporates the functions of the validation service 118 to extract the message keywords 139 and the item keywords 144, compare the message keywords 139 and item keywords, and generate the confidence score 134 according to the comparison.

According to various examples, the client application 121 can analyze the message content data 130 and the item content data 133 to determine a confidence score 134 that represents a likelihood that the item is wrongly attached to or wrongly inserted within the message content associated with the message content data 130. For example, the client application 121 can analyze the message content data 130 by applying the message content data 130 to one or more keyword models 136 that are trained to extract the message keywords 139 for the given context. In various examples, the client application 121 can select a keyword model 136 from a plurality of keyword models 136 according to user account data 141 or other data associated with the message. Upon identifying the message keywords 139, the client application 121 can store the message keywords 139 in the client data store 154. In some examples, the client application 121, via the analysis of the message content data 130, can identify various sections or paragraphs of text within the message content data 130 and store the message keywords 139 in the client data store 154 or other temporary cache with respect to the corresponding section or paragraph from which the keywords were extracted.

The client application 121 can also analyze the item content data 133 to identify item keywords 144 that include keywords extracted from and/or associated with the item content data 133. In various examples, the client application 121 analyzes the item content data 133 by applying the item content data 133 to one or more keyword models 136 that are trained to extract the item keywords 144 for the given type of item (e.g., text document, image, video, hyperlink, etc.).

In various examples, the client application 121 can select a keyword model 136 from a plurality of keyword models 136 according to the type of item to be analyzed. For example, in the example of an attachment, the attachment can comprise an image, a text document, a video, or other type of attachment. In an example where the attachment comprises a text document, the client application 121 may select a keyword model 136 that is trained according to keyword extraction techniques. In an example where the attachment comprises an image, the client application 121 can select a keyword model 136 that is trained according to object character recognition techniques. As such, the client application 121 can identify the type of item according to properties associated with the item (e.g., file type, file size, file name, file format etc.) and select the keyword model 136 to apply the item content data 133 according to the type of item. Upon identifying the item keywords 144, the client application 121 can store the item keywords 144 in the data store 112.

The client application 121 can compare the message keywords 139 and the item keywords 144 to determine a confidence score 134 that represents a likelihood that the item is wrongly attached to or wrongly inserted within the message content associated with the message content data 130. In various examples, the client application 121 can apply the message keywords 139 and the item keywords as labels to a validation model 147. The validation model 147 can comprise one or more machine learning models that are trained to output the confidence score 134 indicating a likelihood that the item is wrongly attached to or inserted within the message. In various examples, the client application 121 can further apply inputs that define the context (e.g., organization, user permissions, user role, item type, etc.) to the validation model 147. The validation model 147 is trained to semantically compare the message keywords 139 with the item keywords 144 to determine the likelihood of a mismatch between the message and the item. In some examples, the validation model 147 can be part of the one or more keyword models 136 or the one or more keyword models 136 can be part of the validation model 147.

The client application 121 can compare the confidence score 134 to a predefined threshold to determine the likelihood of a mismatch. If the confidence score 134 fails to meet or exceed the predefined threshold, the client application 121 can determine that there is a mismatch between the item and the message. In this situation, the client application 121 can generate and render a notification notifying the user of the detected mismatch prior to the user sending the message to a recipient. In various examples, the client application 121 can apply the actions of the user upon receipt of the notification (e.g., modify the attachment or insertion, take no action, etc.) as feedback for subsequent training of the validation model 147.

Figure 2A:
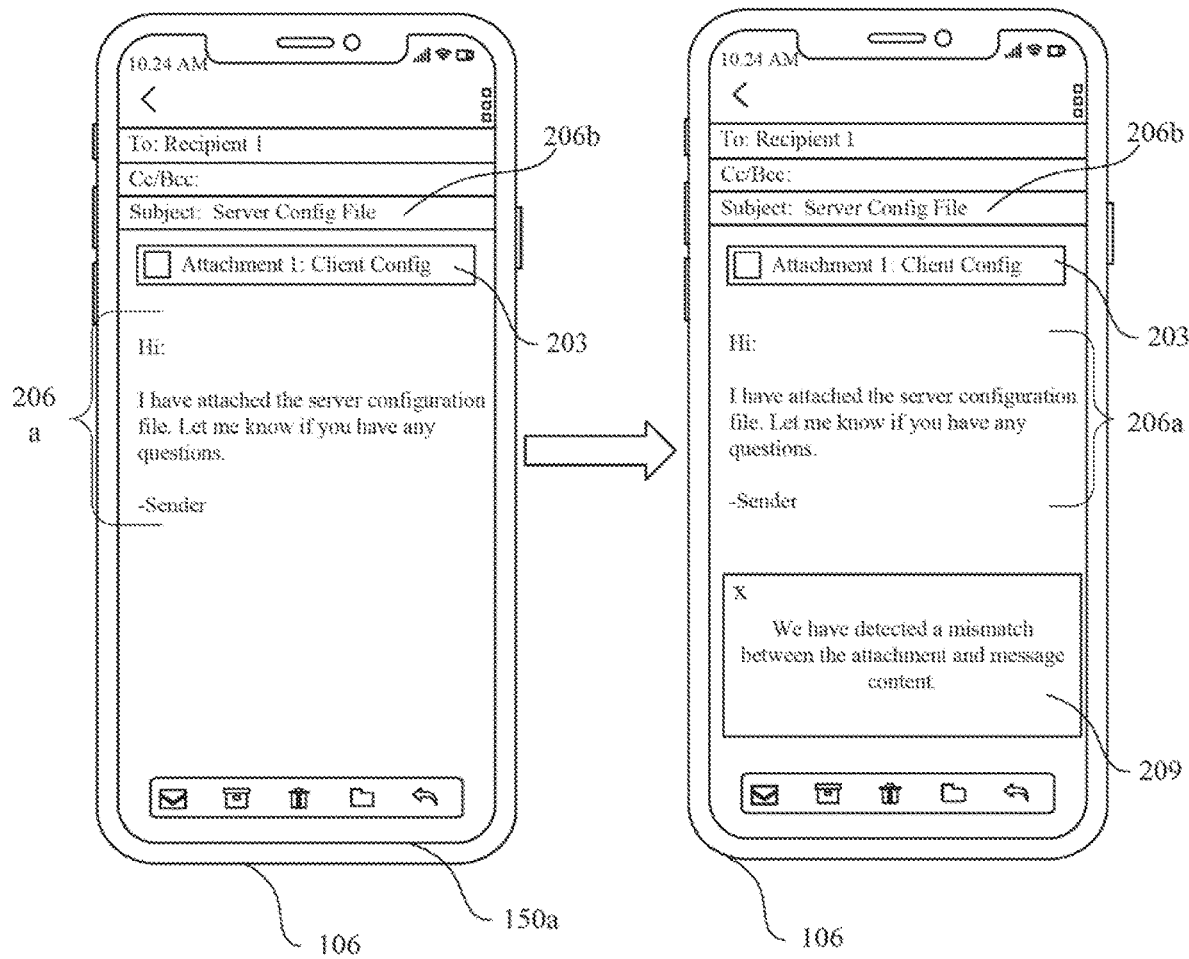
FIGS. 2A-2C illustrate example scenarios associated with identifying an incorrect item (e.g., attachment, image, link, etc.) included in an email message. For example.
Figure 2B:
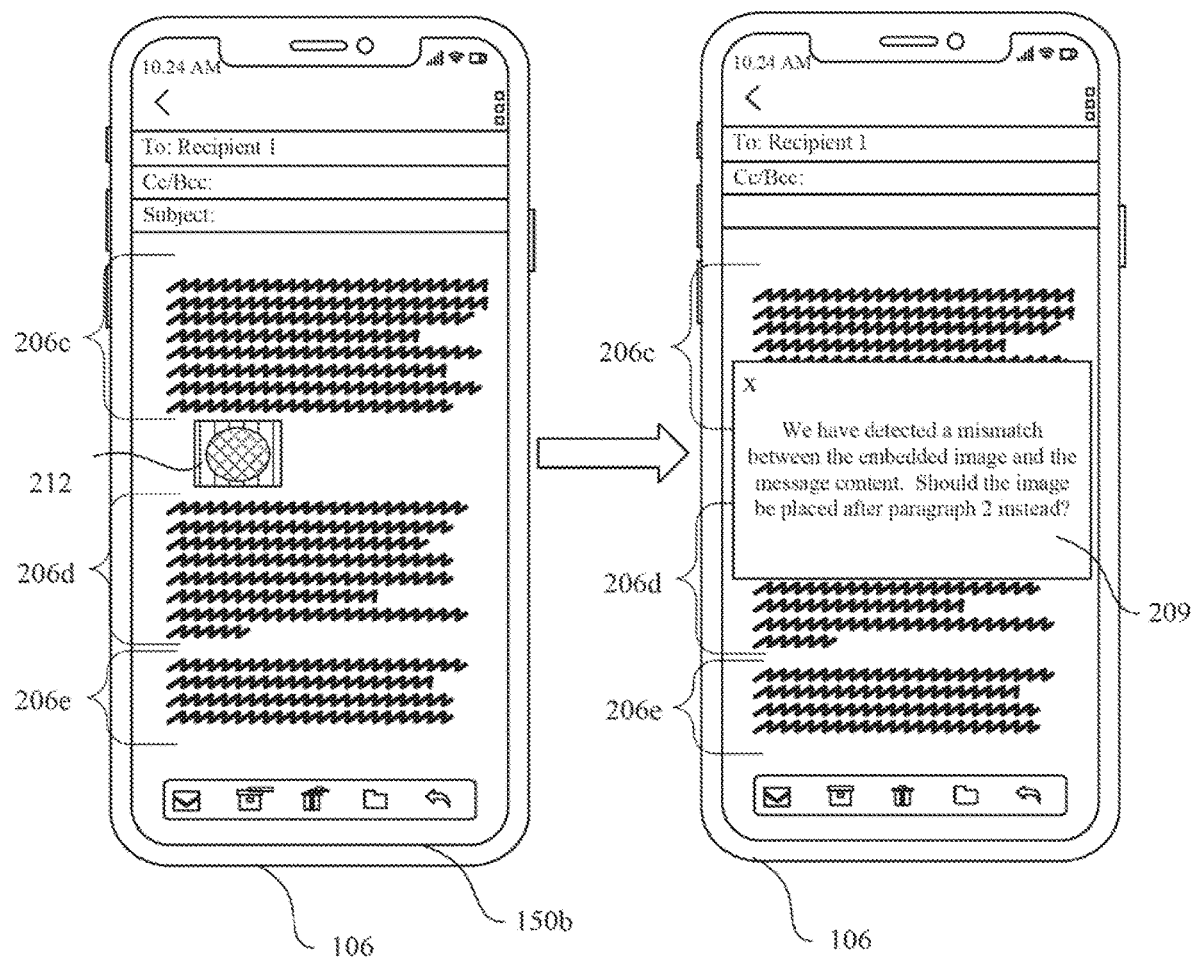
Figure 2C:
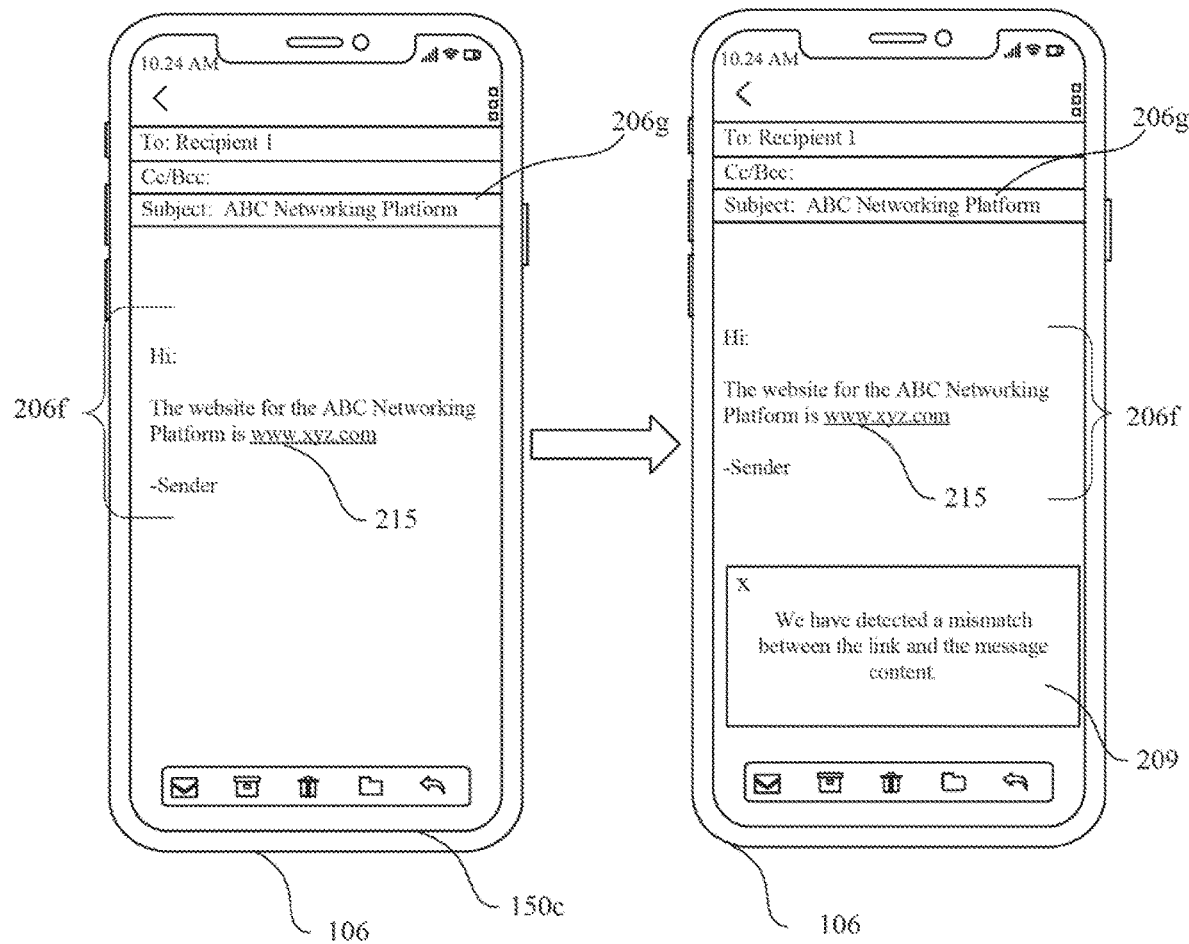

FIGS. 2A-2C illustrate example scenarios 200 (e.g., 200a, 200b, 200c) associated with identifying an incorrect item (e.g., attachment, image, link, etc.) included in an email message. For example, FIG. 2A illustrates an example scenario 200a of an incorrect attachment 203 being attached to an email message being generated via a user interface 150a associated with the client application 121 and rendered on the client device 106. In particular, FIG. 2A illustrates message content 206 (e.g., 206a, 206b) associated with a message being generated by a user via interactions with the user interface 150a of the client application 121. In this example, the message content 206 includes the message body text 206a and the subject text 206b. In addition, the attachment 203 corresponds to a configuration file titled "client config."

As illustrated, the message content 206 references a "server configuration" while the attachment 203 appears to correspond to a "client configuration." According to various examples, the message keywords 139 for the message content data 130 of the message of FIG. 2A should include the term "server" and the item keywords 144 for the item content data 133 for the attachment 203 of FIG. 2A should include the term "client," as extracted from at least the title of the attachment 203. A comparison of the message keywords 139 and the item keywords 144 will result in a confidence score 134 that fails to meet or exceed the predefined threshold. As such, as shown in FIG. 2A, a notification 209 is generated and rendered on the client device 106 to notify the user of the detected mismatch between the attachment 203 and the message content 206. In various examples, the notification 209 can include a pop-up box, an overlay, an inline expansion, a card component, or other type of user interface element.

FIG. 2B illustrates an example scenario of an image 212 being placed in an incorrect position within the body text of the email message. In particular, FIG. 2B illustrates message content 206 (e.g., 206c, 206d, 206e) associated with a message being generated by a user via interactions with the user interface 150b of the client application 121. In this example, the message content 206 include three different paragraphs of text: a first paragraph 206c, a second paragraph 206d, and a third paragraph 206e. In addition, the message includes an embedded object corresponding to an image 212 inserted inline between the first paragraph 206c and the second paragraph 206d.

According to various examples, the message keywords 139 for the message content data 130 can be extracted according to the various disclosed examples, and can be stored in association with the particular paragraph from which they were extracted. For example, message keywords 139 extracted from the first paragraph 206c can be stored in association with the first paragraph 206c and the message keywords 139 extracted from the second paragraph 206d can be stored in association with the second paragraph 206d. In addition, the image 212 can be analyzed by applying the appropriate keyword model 136 in order to identify item keywords 144 for the image 212. A comparison of the message keywords 139 and the item keywords 144 will result in a confidence score 134 that fails to meet or exceed the predefined threshold.

In some examples, the comparison may occur for each paragraph of the message content 206 to identify whether there is an alternative placement in the message content 206 for the image 212. For example, a confidence score 134 associated with the first paragraph 206c may fail to meet or exceed the predefined threshold while a confidence score 134 associated with the second paragraph 206d may meet or exceed the predefined threshold. This can indicate that image 212 is improperly inserted in the message content 206 and that an alternative position would be after the second paragraph 206d. If the confidence score 134 for the current location fails to meet or exceed the predefined threshold, a notification 209 is generated and rendered on the client device 106 to notify the user of the detected mismatch between the image 212 and the message content 206. In addition, as shown in FIG. 2B, the notification can provide a suggestion for an alternative position within the message content 206 for inserting the image 212. In various examples, the notification 209 can include a pop-up box, an overlay, an inline expansion, a card component, or other type of user interface element.

FIG. 2C illustrates an example of an incorrect link being included in the content of an email message. In particular, FIG. 2C illustrates message content 206 (e.g., 206f, 206g) associated with a message being generated by a user via interactions with the user interface 150c of the client application 121. In this example, the message content 206 includes the message body text 206f and the subject text 206g. In addition, a hyperlink 215 has been added to the message by the user.

As illustrated, the message content 206 references an "ABC Networking Platform" while the hyperlink 215 appears to correspond to a "XYZplatform." According to various examples, the message keywords 139 for the message content data 130 of the message of FIG. 2C should include the term "ABC," "Networking" and "Platform" and the item keywords 144 for the item content data 133 for the attachment 203 of FIG. 2A should include the term "XYZ" and "platform" as extracted from at least the terms in the hyperlink 215. A comparison of the message keywords 139 and the item keywords 144 will result in a confidence score 134 that fails to meet or exceed the predefined threshold. As such, as shown in FIG. 2C, a notification 209 is generated and rendered on the client device 106 to notify the user of the detected mismatch between the hyperlink 215 and the message content 206. In various examples, the notification 209 can include a pop-up box, an overlay, an inline expansion, a card component, or other type of user interface element.

Next, a general description of the operation of the various components of the network environment 100 is provided with reference to FIGS. 3-7. It should be noted that although the discussion of FIG. 1 discusses the client device 106 being enrolled in a management service 115, enrollment in a management service 115 is optional and is not a required for integration of the comparison of items and messages to determine mismatches between items and messages. In some examples, if a user is not enrolled in a management service 115, the client application 121 will operate with the functionally associated with an offline setting.

Figure 3:
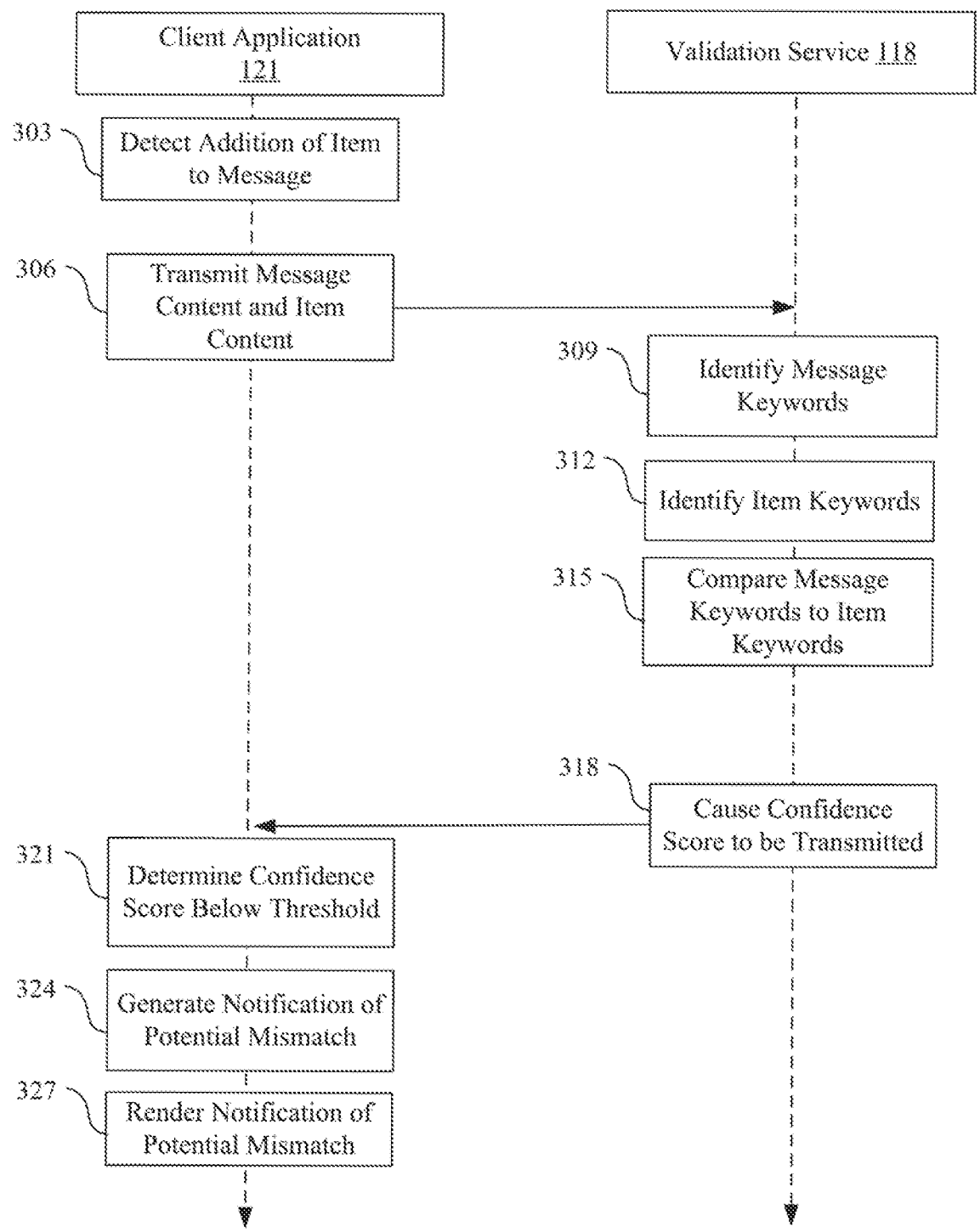
FIG. 3 is a sequence diagram depicting the operation of components of the network environment of FIG. 1.

Turning now to FIG. 3, shown is a sequence diagram 300 that provides one example of the operation of the network environment 100.

Beginning at step 303, the client application 121 can detect an addition of an item to a message being generated by a user interacting with a user interface 150 associated with the client application 121. In some examples, the item includes an attachment 203 and the client application 121 can determine when the attachment 203 has been attached to the message by the user interacting with the user interface 150. For example, the user interface 150 can have an attachment component that, when selected, facilitates the selection of and addition of the attachment by the user to the message. In other examples, the item includes an embedded object, such as an image 212, that is inserted inline with the message content 206 of the message being generated. In this example, the user interface 150 can facilitate the insertion of an embedded object into the inline of the message content, as can be appreciated. As the image 212 is inserted within the text of the message, the client application 121 can detect the addition of the item.

At step 306, the client application 121 transmits the message content data 130 and the item content data 133 to the validation service 118 in the computing environment 103. In this example, the client application 121 can determine that the client device 106 is operating in an online environment and generates the message content data 130 and item content data 133 to be sent to the validation service 118 over the network 109. In various examples, the message content data 130 corresponds to the content (e.g., subject, body text, etc.) of a message or document being created by a user (e.g., message sender, document creator) via the client application 121. Similarly, the item content data 133 corresponds to the content associated with the item (e.g., item title, item file name, image, text document, presentation document, video, hyperlink, etc.) being attached to or inserted within the message or document.

At step 309, the validation service 118 identifies the message keywords 139. The validation service 118 can analyze the message content data 130 to identify message keywords 139 that include terms extracted from the message and other message details (e.g., entity names for sections or paragraphs in the message body) from the message content data 130 with respect to the given message context. In various examples, the validation service 118 analyzes the message content data 130 by applying the message content data 130 to one or more keyword models 136 that are trained to extract the message keywords 139 for the given context.

In various examples, the validation service 118 selects a keyword model 136 from a plurality of keyword models 136 according to sender user account data 141 or other data associated with the message. The sender user account data 141 can include various information about the sender including, for example, a role of the sender in an organization, access permissions associated with the sender, an organization or business unit associated with the sender, or other data that can further define the context of a given message.

Upon identifying the message keywords 139, the validation service 118 can store the message keywords 139 in the data store 112. In some examples, the validation service 118, via the analysis of the message content data 130, can identify various sections or paragraphs of text within the message content data 130 and store the message keywords 139 in the data store 112 or other temporary cache with respect to the corresponding section or paragraph from which the keywords were extracted.

At step 312, the validation service 118 identifies the item keywords 144 that include keywords or terms extracted from and/or associated with the item content data 133. In various examples, the validation service 118 can analyze the item content data 133 by applying the item content data 133 to one or more keyword models 136 that are trained to extract the item keywords 144 for the given type of item (e.g., text document, image, video, hyperlink, screenshot, etc.).

In various examples, the validation service 118 can select a keyword model 136 from a plurality of keyword models 136 according to the type of item to be analyzed. For example, such, the validation service 118 can identify the type of item (e.g., image, video, text document, etc.) according to properties associated with the item (e.g., file type, file size, file name, file format etc.) and select the appropriate keyword model 136 according to the type of item. Upon identifying the item keywords 144, the validation service 118 can store the item keywords 144 in the data store 112 or other temporary cache.

At step 315, the validation service 118 can semantically compare the message keywords 139 and the item keywords 144 to determine a confidence score 134 that reflects a likelihood that the item is wrongly attached to or wrongly inserted within the message content associated with the message content data 130. In various examples, the validation service 118 can apply the message keywords 139 and the item keywords as labels to a validation model 147. The validation model 147 can comprise one or more machine learning models that are trained to output the confidence score 134 indicating a likelihood that the item is wrongly attached to or inserted within the message. In various examples, the validation service 118 can further apply inputs that define the context (e.g., organization, user permissions, user role, item type, etc.) to the validation model 147. The confidence score 134 corresponds to the output of the validation model 147.

At step 318, the validation service 118 causes the confidence score 134 to be transmitted to the client application 121. In some examples, the validation service 118 can transmit the confidence score 134 to the client application 121. In other examples, the validation service 118 can interact with the management service 115 which in turn provides the confidence score 134 to the client device 106. For example, the management service 115 can push the confidence score 134 to the client application 121. In another example, the management service 115 can store the confidence score 134 in a command queue and the client application 121 can retrieve the contents of the command queue (e.g., the confidence score 134) on a configured interval or upon detection of a certain event.

At step 321, the client application 121 can compare the confidence score 134 to a threshold and determine that the confidence score 134 is below the predetermined threshold indicating the likelihood of a mismatch. When the confidence score 134 fails to meet or exceed the predefined threshold, the client application 121 can determine that there is a mismatch between the item and the message. In some examples, there may be multiple confidence scores 134 associated with different sections or paragraphs of a message. In this example, the client application 121 can compare each confidence score 134 to the predefined threshold to determine the paragraph or section with the highest confidence score 134.

At step 324, the client application 121 can generate a notification 209 notifying the user of the detected mismatch prior to the user sending the message to a recipient. In various examples, the notification 209 can include a pop-up box, an overlay, an inline expansion, a card component, or other type of user interface element. In some examples, the notification 209 can further include an alternative location for an insertion of an embedded object when the item is an embedded object and the confidence score 134 of the current location fails to meet or exceed the predefined threshold.

At step 327, the client application 121 can render the notification 209 on a display 153 of the client device 106. In various examples, the client application 121 can further apply the actions of the user upon receipt of the notification 209 (e.g., modify the attachment or insertion, take no action, etc.) as feedback for subsequent training of the validation model 147. Thereafter, this portion of the operation proceeds to completion.

Figure 4:
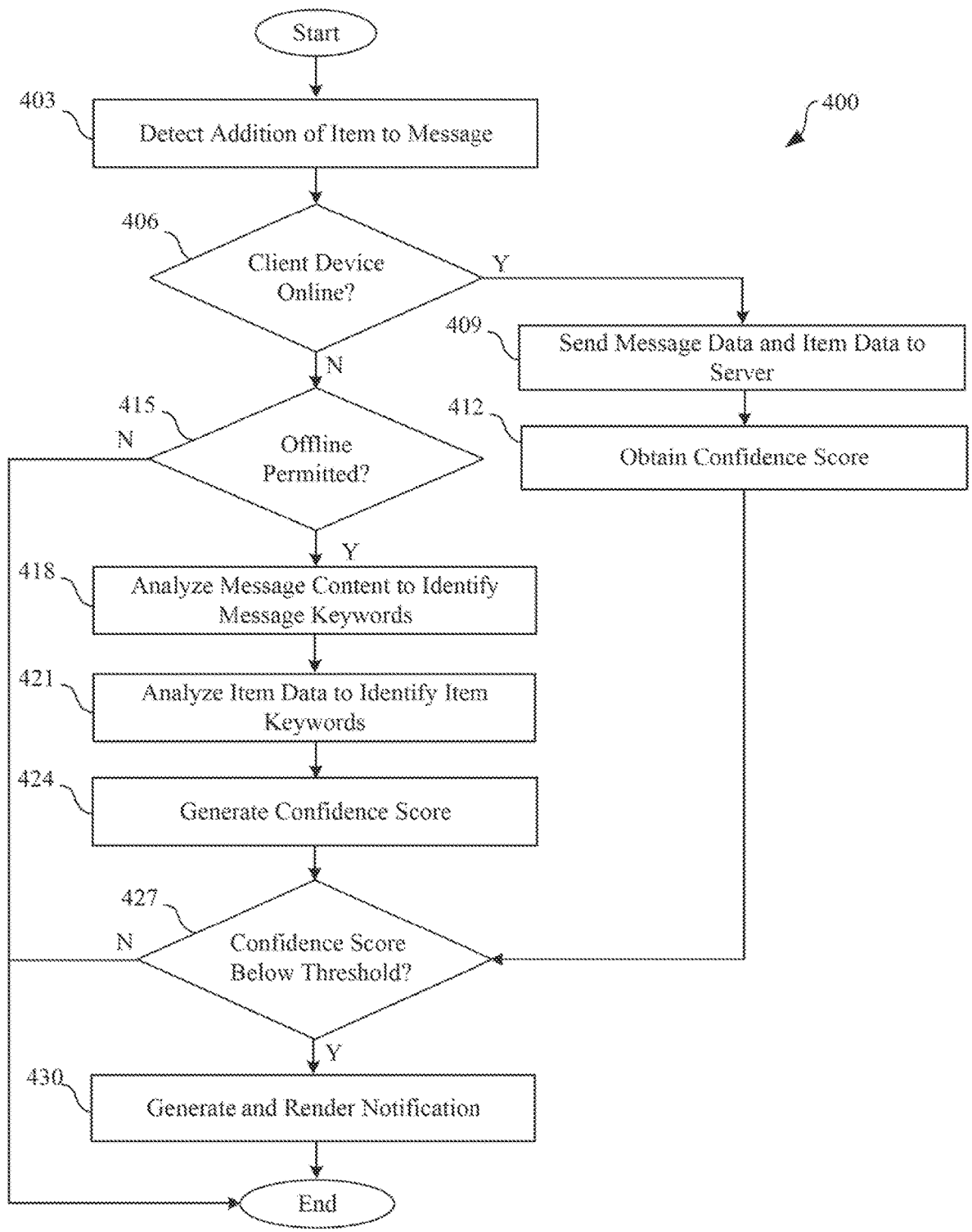
FIG. 4 is a flowchart depicting the operation of an example of a component of the client device of the network environment of FIG. 1.

Turning now to FIG. 4, shown is a flowchart 400 that provides one example of the operation of a portion of the client device 106.

Beginning with step 403, the client application 121 can detect an addition of an item to a message being generated by a user interacting with a user interface 150 associated with the client application 121. In some examples, the item includes an attachment 203 and the client application 121 can determine when the attachment 203 has been attached to the message by the user interacting with the user interface 150. For example, the user interface 150 can have an attachment component that, when selected, facilitates the selection of and addition of the attachment by the user to the message. In other examples, the item includes an embedded object, such as an image 212, that is inserted inline with the message content 206 of the message being generated. In this example, the user interface 150 can facilitate the insertion of an embedded object into the inline of the message content, as can be appreciated. As the image 212 is inserted within the text of the message, the client application 121 can detect the addition of the item.

At step 406, the client application 121 determines whether the client device 106 is online. In this example, the client device 106 is online when the client device 106 is operating within the enterprise network or other network that allows the client device 106 to be able to communicate with the computing environment 103 over the network 109. If the client device 106 is determined to be online, the client application 121 proceeds to step 409. Otherwise, the client application 121 proceeds to step 415.

At step 409, the client application 121 sends the message content data 130 and the item content data 133 to the validation service 118 in the computing environment 103 since the client device 106 is operating in an online environment. In various examples, the message content data 130 corresponds to the content (e.g., subject, body text, etc.) of a message or document being created by a user (e.g., message sender, document creator) via the client application 121. Similarly, the item content data 133 corresponds to the content associated with the item (e.g., item title, item file name, image, text document, presentation document, video, hyperlink, etc.) being attached to or inserted within the message or document.

At step 412, the client application 121 receives the confidence score 134 from the computing environment 103. In some examples, the validation service 118 can transmit the confidence score 134 to the client application 121. In other examples, the validation service 118 can interact with the management service 115 which in turn provides the confidence score 134 to the client application 121. For example, the management service 115 can push the confidence score 134 to the client application 121. In another example, the management service 115 can store the confidence score 134 in a command queue and the client application 121 can retrieve the contents of the command queue (e.g., the confidence score 134) on a configured interval or upon detection of a certain event.

At step 415, following a determination that the client device 106 is operating in an offline setting, the client application 121 if the client application is permitted to analyze the message content data 130 and item content data 133 in an offline setting. For example, although the client device 106 is operating in an offline setting, the operations of the client device 106 and client application 121 can operate according to configurations defined by the management service 115. Therefore, the client device 106 and client application 121 can include an offline setting that is defined by the management service 115 and indicates whether the client application 121 can analyze the message and item in an offline setting. If the configuration indicates that the client application 121 is not permitted to analyze the message and item in the offline setting, this portion of the process proceeds to completion. Otherwise, the client application 121 proceeds to step 418.

At step 418, the client application 121 analyzes the message content data 130 to identify the message keywords 139. For example, the client application 121 can analyze the message content data 130 by applying the message content data 130 to one or more keyword models 136 that are trained to extract the message keywords 139 for the given context. In various examples, the client application 121 can select a keyword model 136 from a plurality of keyword models 136 according to user account data 141 or other data associated with the message. Upon identifying the message keywords 139, the client application 121 can store the message keywords 139 in the client data store 154. In some examples, the client application 121, via the analysis of the message content data 130, can identify various sections or paragraphs of text within the message content data 130 and store the message keywords 139 in the client data store 154 or other temporary cache with respect to the corresponding section or paragraph from which the keywords were extracted.

At step 421, the client application 121 can analyze the item content data 133 to identify item keywords 144 that include keywords extracted from and/or associated with the item content data 133. In various examples, the client application 121 analyzes the item content data 133 by applying the item content data 133 to one or more keyword models 136 that are trained to extract the item keywords 144 for the given type of item (e.g., text document, image, video, hyperlink, etc.).

In various examples, the client application 121 can select a keyword model 136 from a plurality of keyword models 136 according to the type of item to be analyzed. For example, in the example of an attachment, the attachment can comprise an image, a text document, a video, or other type of attachment. In an example where the attachment comprises a text document, the client application 121 may select a keyword model 136 that is trained according to keyword extraction techniques. In an example where the attachment comprises an image, the client application 121 can select a keyword model 136 that is trained according to object character recognition techniques. As such, the client application 121 can identify the type of item according to properties associated with the item (e.g., file type, file size, file name, file format etc.) and select the keyword model 136 to apply the item content data 133 according to the type of item. Upon identifying the item keywords 144, the client application 121 can store the item keywords 144 in the data store 112.

At step 424, the client application 121 can compare the message keywords 139 and the item keywords 144 to determine a confidence score 134 that represents a likelihood that the item is wrongly attached to or wrongly inserted within the message content associated with the message content data 130. In various examples, the client application 121 can apply the message keywords 139 and the item keywords as labels to a validation model 147. The validation model 147 can comprise one or more machine learning models that are trained to output the confidence score 134 indicating a likelihood that the item is wrongly attached to or inserted within the message. In various examples, the client application 121 can further apply inputs that define the context (e.g., organization, user permissions, user role, item type, etc.) to the validation model 147. The validation model 147 is trained to semantically compare the message keywords 139 with the item keywords 144 to determine the likelihood of a mismatch between the message and the item. The output of the validation model 147 corresponds to the confidence score 134.

At step 427, the client application 121 determines whether the confidence score 134 is below a predefined threshold. If the confidence score 134 fails to meet or exceed the predefined threshold, the client application 121 can determine that there is a mismatch between the item and the message and proceed to step 430. Otherwise, this portion of the process proceeds to completion.

At step 430, the client application 121 can generate and render a notification 209 notifying the user of the detected mismatch prior to the user sending the message to a recipient. In various examples, the client application 121 can further apply the actions of the user upon receipt of the notification 209 (e.g., modify the attachment or insertion, take no action, etc.) as feedback for subsequent training of the validation model 147. Thereafter, this portion of the process proceeds to completion.

Figure 5:
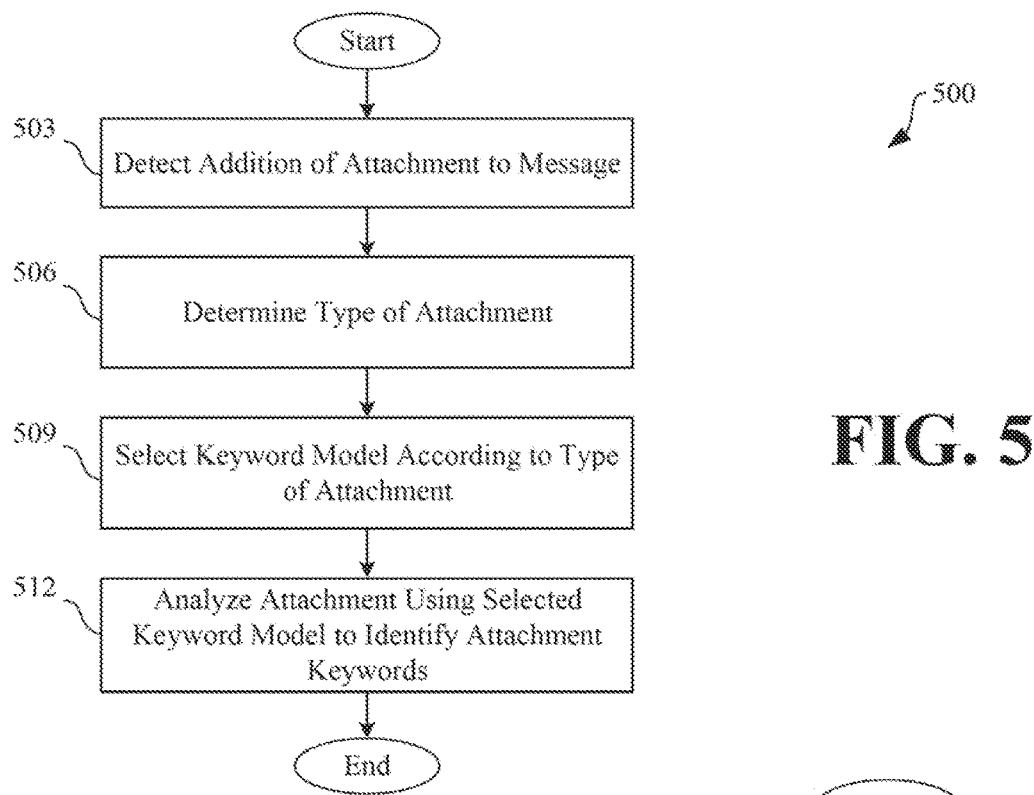
FIG. 5 is a flowchart depicting the operation of an example of a component of the client device of the network environment of FIG. 1.

Turning now to FIG. 5, shown is a flowchart 500 that provides one example of the operation of a portion of the client device 106.

At step 503, the client application 121 can detect an addition of an attachment 203 to a message being generated by a user interacting with a user interface 150 associated with the client application 121. For example, the user interface 150 can have an attachment component that, when selected, facilitates the selection of and addition of the attachment by the user to the message.

At step 506, the client application 121 determines the type of attachment 203. The attachment can comprise an image, a text document, a video, or other type of attachment. According to various examples, the client application 121 can identify the type of item according to properties associated with the item (e.g., file type, file size, file name, file format etc.). For examples, an attachment having a ".jpg" extension can be considered an image while an attachment having a ".txt" extension can be considered a text document.

At step 509, the client application 121 selects a keyword model 136 from a plurality of keyword models 136 based at least in part on the type of attachment 203. In an example where the attachment comprises a text document, the client application 121 may select a keyword model 136 that is trained according to keyword extraction techniques. In an example where the attachment comprises an image, the client application 121 can select a keyword model 136 that is trained according to object character recognition techniques.

At step 512, the client application 121 can analyze the item content data 133 to identify item keywords 144 that include keywords extracted from and/or associated with the item content data 133. For example, the client application 121 can analyze the item content data 133 by applying the item content data 133 to the selected keyword model 136 that is trained to extract the item keywords 144 for the given type of attachment 203 (e.g., text document, image, video, hyperlink, etc.). Thereafter, this portion of the process proceeds to completion.

Figure 6:
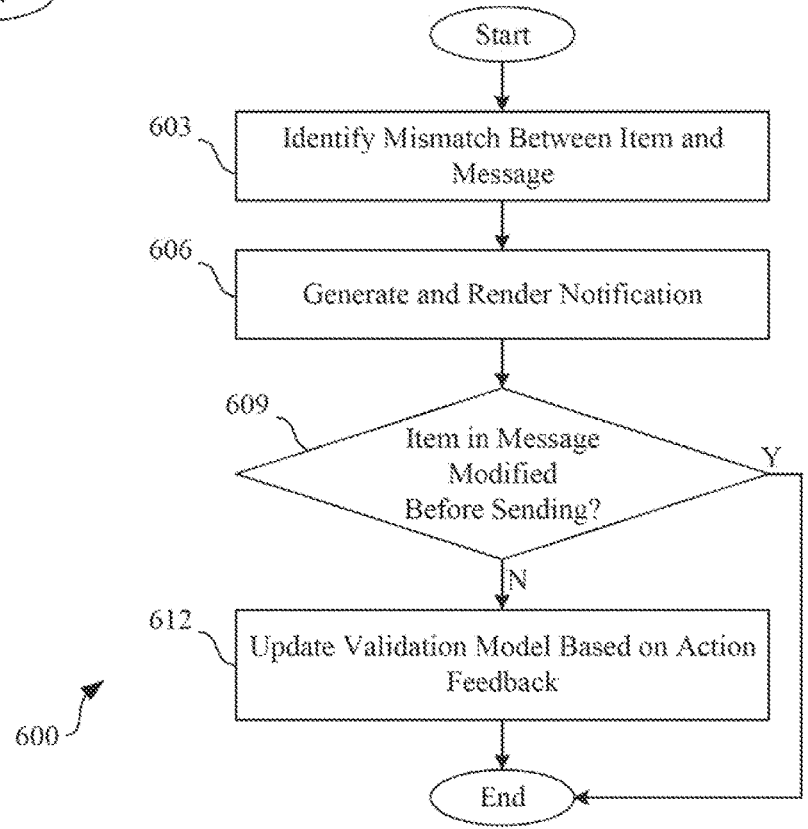
FIG. 6 is a flowchart depicting the operation of an example of a component of the client device of the network environment of FIG. 1.

Turning now to FIG. 6, shown is a flowchart 600 that provides one example of the operation of a portion of the client device 106.

At step 603, the client application 121 identifies a mismatch between the item content data 133 and the message content data 130. For example, the client application 121 can compare the message keywords 139 and the item keywords 144 to determine a confidence score 134 that represents a likelihood that the item is wrongly attached to or wrongly inserted within the message content associated with the message content data 130. If the confidence score 134 fails to meet or exceed the predefined threshold, the client application 121 can determine that there is a mismatch between the item and the message.

At step 606, the client application 121 can generate and render a notification 209 notifying the user of the detected mismatch prior to the user sending the message to a recipient. In various examples, the notification 209 can include a pop-up box, an overlay, an inline expansion, a card component, or other type of user interface element. In some examples, the notification 209 can further include an alternative location for an insertion of an embedded object when the item is an embedded object and the confidence score 134 of the current location fails to meet or exceed the predefined threshold. The client application 121 can render the notification 209 on a display 153 of the client device 106.

At step 609, the client application 121 determines if the item in the message is modified before the message is sent to the recipient. For example, upon receipt of the notification 209 of the mismatch between the item and message, the client application 121 can determine if the item or item placement was modified prior to the message being sent or if the user took no action with regard to the notification. If the item or item placement was modified, this portion of the process proceeds to completion. Otherwise, the client application 121 proceeds to step 612.

At step 612, the client application 121 causes the validation model 147 to be updated by providing the feedback associated with the user choosing not to modify the item or item placement the same following receipt of the notification 209 as an input to the validation model 147. Therefore, the validation model 147 can learn from the apparent prediction mistake. Thereafter, this portion of the process proceeds to completion.

Figure 7:
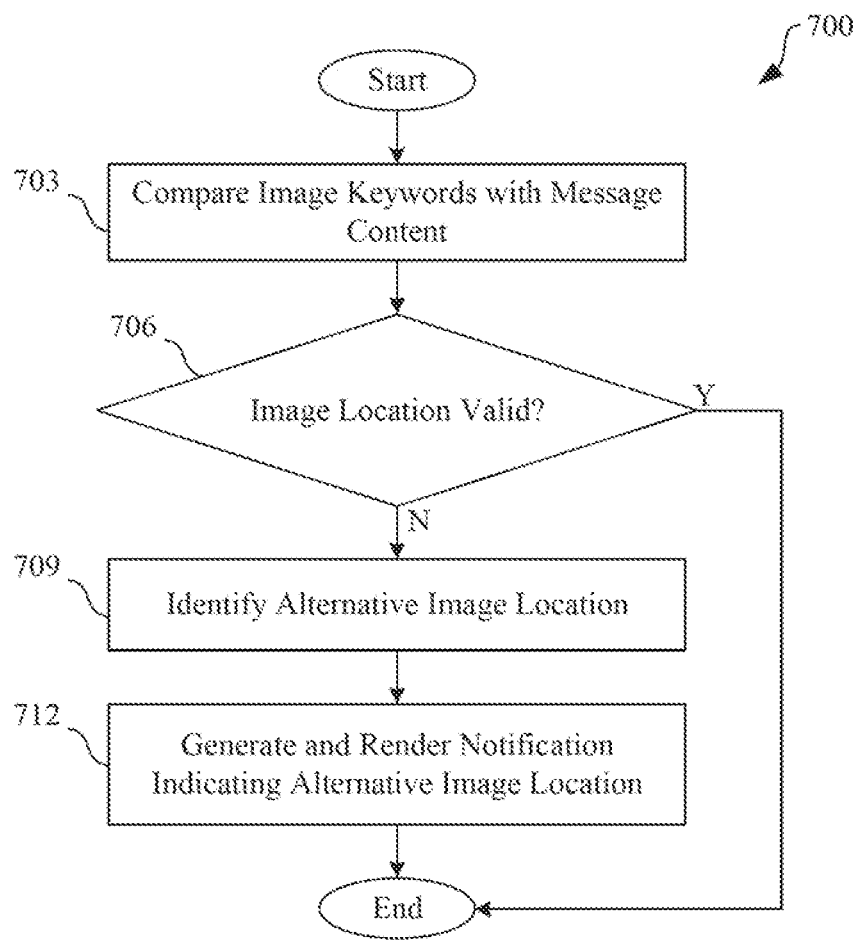
FIG. 7 is a flowchart depicting the operation of an example of a component of the client device of the network environment of FIG. 1.

Turning now to FIG. 7, shown is a flowchart 700 that provides one example of the operation of a portion of the client device 106.

At box 703, the client application 121 can compare the message keywords 139 and the item keywords 144 to determine a confidence score 134 that represents a likelihood that the item is wrongly attached to or wrongly inserted within the message content associated with the message content data 130. In various examples, the client application 121 can apply the message keywords 139 and the item keywords as labels to a validation model 147. The validation model 147 can comprise one or more machine learning models that are trained to output the confidence score 134 indicating a likelihood that the item is wrongly attached to or inserted within the message. In various examples, the client application 121 can further apply inputs that define the context (e.g., organization, user permissions, user role, item type, etc.) to the validation model 147. The validation model 147 is trained to semantically compare the message keywords 139 with the item keywords 144 to determine the likelihood of a mismatch between the message and the item. The output of the validation model 147 corresponds to the confidence score 134.

In some examples, there may be multiple confidence scores 134 associated with different sections or paragraphs of a message. For example, the client application 121, via the analysis of the message content data 130, can identify various sections or paragraphs of text within the message content data 130 and store the message keywords 139 in the client data store 154 or other temporary cache with respect to the corresponding section or paragraph from which the keywords were extracted. In this example, the client application 121 can the item keywords 144 with the message keywords 139 for each section or paragraph.

At step 706, the client application 121 can determine whether an image location is valid. In the example of the inserted image 212 within the text of the message, the client application can determine if the confidence score 134 associated with message content data 130 for the current location (e.g., paragraph) and the item content data 133 fails to meet or exceed the predefined threshold. If the confidence score 134 fails to meet or exceed the predefined threshold, the client application 121 proceeds to step 709. Otherwise, this portion of the process proceeds to completion.

At step 709, the client application 121 can identify an alternative image location within the message content data 130. For example, if a confidence score 134 associated with the item content data 133 and the message content data 130 for a different section or paragraph meets or exceeds the predefined threshold, the client application 121 can identify the location associated with the different section or paragraph as the alternative image location.

At step 712, the client application 121 can generate and render a notification 209 notifying the user of the detected mismatch prior to the user sending the message to a recipient. The notification 209 further indicates the alternative location identified at step 709. The client application 121 can render the notification 209 on a display 153 of the client device 106. Thereafter, this portion of the process proceeds to completion.

The sequence diagram of FIG. 3 and the flowcharts of FIGS. 4-7 show examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the sequence diagram of FIG. 3 and the flowcharts of FIGS. 4-7 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the computing devices or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions on an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth a clear understanding of the principles of the disclosure. Many variations and modifications can be made to the above-described examples without departing substantially from the spirit and principles of the disclosure. All modifications and variations are intended to be included herein within the scope of this disclosure.

What is claimed is:

1. A system for determining a relevance of an item added to a message, the system comprising:
a client device;
at least one application executable in the client device, wherein, when executed, the at least one application causes the client device to at least:
detect an addition of the item to the message being generated by a sender in a user interface of a client application of the client device, the item comprising at least one of: an attachment to the message or an embedded object within the message;
determine a confidence score based at least in part on a comparison of: a plurality of message keywords extracted from user-entered message content of the message during creation of the message within the user interface of the client application, and a plurality of item keywords extracted from image data or video data of the embedded object that is inserted in a particular position in the user-entered message content during the creation of the message, the confidence score indicating a likelihood of a mismatch between the item and the message; and
render a notification on a display of the client device in an instance in which the confidence score fails to meet or exceed a predefined threshold, the notification identifying the mismatch between the item and the message and positioning information based at least in part on the particular position of the embedded object.

2. The system of claim 1, wherein the item comprises the attachment to the message, and wherein, when executed, the at least one application causes the client device to at least determine a type of attachment associated with the attachment, the item keywords being extracted according to an analysis that is based at least in part on the type of attachment.

3. The system of claim 1, wherein the item comprises the embedded object, and the embedded object comprises an embedded image or a link.

4. The system of claim 3, wherein, when executed, the at least one application causes the client device to at least identify an alternative location within the message content for inclusion of the embedded object based at least in part on the comparison of the message keywords and the item keywords, the notification indicating the alternative location.

5. The system of claim 4, wherein the message keywords are associated with a respective content section of the message content that includes a respective keyword in the message keywords, and identifying the alternative location is further based at least in part on the respective content section of the message content.

6. The system of claim 1, wherein the client device is enrolled in a management service operated by an enterprise, and when executed, the at least one application causes the client device to at least:
extract the message keywords from the message content according to an analysis of the message content that is based at least in part on a role of the sender in the enterprise.

7. The system of claim 1, wherein, when executed, the at least one application further causes the client device to at least:
send the message content and item content comprising the item to at least one computing device, the at least one computing device being configured to:
extract the message keywords from the message content;
extract the item keywords from the item content; and
calculate the confidence score based at least in part on the comparison of the message keywords and the item keywords; and
receive the confidence score from the at least one computing device.

8. A method for determining a relevance of an item added to a message, the method comprising:
detecting, by a client device, an addition of the item to the message being generated by a sender in a user interface of a client application of the client device, the item comprising at least one of: an attachment to the message or an embedded object within the message;
determining, by the client device, a confidence score based at least in part on a comparison of: a plurality of message keywords extracted from user-entered message content of the message during creation of the message within the user interface of the client application, and a plurality of item keywords extracted from image data or video data of the embedded object that is inserted in a particular position in the user-entered message content during the creation of the message, the confidence score indicating a likelihood of a mismatch between the item and the message; and
rendering, by the client device, a notification on a display of the client device in an instance in which the confidence score fails to meet or exceed a predefined threshold, the notification identifying the mismatch among the item and the message and positioning information based at least in part on the particular position of the embedded object.

9. The method of claim 8, wherein the item comprises the attachment to the message, and further comprising determining a type of attachment associated with the attachment, the item keywords being extracted according to an analysis that is based at least in part on the type of attachment.

10. The method of claim 8, wherein the item comprises the embedded object, and the embedded object comprises an embedded image or an embedded link.

11. The method of claim 10, further comprising identifying, by the client device, an alternative location within the message content for inclusion of the embedded object based at least in part on the comparison of the message keywords and the item keywords, the notification indicating the alternative location.

12. The method of claim 11, wherein the message keywords are associated with a respective content section of the message content that includes a respective keyword in the message keywords, and identifying the alternative location is further based at least in part on the respective content section of the message content.

13. The method of claim 8, wherein the client device is enrolled in a management service operated by an enterprise, and further comprising:
extracting, by the client device, the message keywords from the message content according to an analysis of the message content that is based at least in part on a role of the sender in the enterprise.

14. The method of claim 8, further comprising:
sending, by the client device, the message content and item content comprising the item to at least one computing device, the at least one computing device being configured to:
extract the message keywords from the message content;
extract the item keywords from the item content; and
calculate the confidence score based at least in part on the comparison of the message keywords and the item keywords; and
receiving, by the client device, the confidence score from the at least one computing device.

15. A non-transitory computer readable medium for determining a relevance of an item added to a message, the non-transitory computer readable medium comprising machine-readable instructions that, when executed by a processor of a client device, cause the client device to at least:
detect an addition of the item to the message being generated by a sender in a user interface of a client application of the client device, the item comprising at least one of: an embedded object within the message;
determine a confidence score based at least in part on a comparison of: a plurality of message keywords extracted from user-entered message content of the message during creation of the message within the user interface of the client application, and a plurality of item keywords extracted from image data or video data of the embedded object that is inserted in a particular position in the user-entered message content during the creation of the message, the confidence score indicating a likelihood of a mismatch between the item and the message; and
render a notification on a display of the client device in an instance in which the confidence score fails to meet or exceed a predefined threshold, the notification identifying the mismatch among the item and the message and positioning information based at least in part on the particular position of the embedded object.

16. The non-transitory computer readable medium of claim 15, wherein the item comprises the attachment to the message, and wherein, when executed, the machine-readable instructions cause the client device to at least determine a type of attachment associated with the attachment, the item keywords being extracted according to an analysis that is based at least in part on the type of attachment.

17. The non-transitory computer readable medium of claim 16, wherein:
the item comprises the embedded object, and the embedded object comprises an embedded image or an embedded link; and
when executed, the machine-readable instructions cause the client device to at least identify an alternative location within the message content for inclusion of the embedded object based at least in part on the comparison of the message keywords and the item keywords, the notification indicating the alternative location.

18. The non-transitory computer readable medium of claim 17, wherein the message keywords are associated with a respective content section of the message content that includes a respective keyword in the message keywords, and identifying the alternative location is further based at least in part on the respective content section of the message content.

19. The non-transitory computer readable medium of claim 15, wherein the client device is enrolled in a management service operated by an enterprise, and when executed, the machine-readable instructions further cause the client device to at least:
extract the message keywords from the message content according to an analysis of the message content that is based at least in part on a role of the sender in the enterprise.

20. The non-transitory computer readable medium of claim 15, when executed, the machine-readable instructions further cause the client device to at least:
send the message content and item content comprising the item to at least one computing device, the at least one computing device being configured to:
extract the message keywords from the message content;
extract the item keywords from the item content; and
calculate the confidence score based at least in part on the comparison of the message keywords and the item keywords; and
receive the confidence score from the at least one computing device.

* * * * *